No. 12,308. REISSUED JAN. 24, 1905.

A. DEWERPE.

GLASS BLOWING AND DRAWING TOOL.

APPLICATION FILED DEC. 27, 1904.

Witnesses

J. Lemmie

L. M. Phillips

Inventor

Auguste Dewerpe,

By Geo. H. Harvey his Attorney.

No. 12,308. Reissued January 24, 1905.

UNITED STATES PATENT OFFICE.

AUGUSTE DEWERPE, OF CONVERSE, INDIANA, ASSIGNOR OF ONE-HALF TO JULES MAYEUR, SR., OF CONVERSE, INDIANA.

GLASS BLOWING AND DRAWING TOOL.

SPECIFICATION forming part of Reissued Letters Patent No. 12,308, dated January 24, 1905.

Original No. 747,049, dated December 15, 1903. Application for reissue filed December 27, 1904. Serial No. 238,537.

*To all whom it may concern:*

Be it known that I, AUGUSTE DEWERPE, a citizen of the United States of America, residing at Converse, in the county of Grant and State of Indiana, have invented certain new and useful Improvements in Glass Blowing and Drawing Tools, of which the following is such a full, clear, and exact description as will enable others skilled in the art to which it appertains to make and use the same, reference being had to the accompanying drawings, forming a part thereof.

This invention seeks to provide a blowing and drawing tool for making hollow ware which can easily be manipulated and in which the escape of the blowing fluid will be effected automatically. Such a drawing-tool is illustrated in the accompanying drawings; and the invention consists in certain novel features of the same, as will be hereinafter first fully described and then particularly pointed out in the claims.

Figure 1:
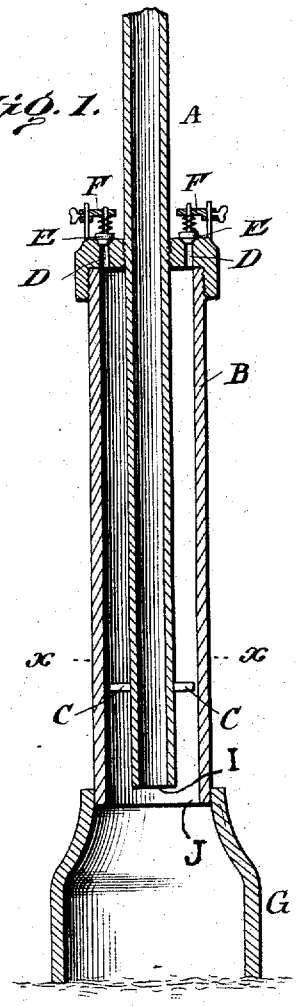
Figure 2:
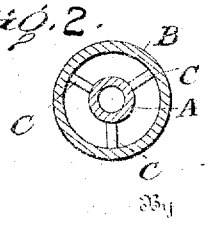

In the drawings, Figure 1 is a vertical section of a tool embodying the invention. Fig. 2 is a horizontal section taken on the line *x x* of Fig. 1, and Fig. 3 is a vertical section of a modified form of a tool.

Referring particularly to the drawings, it will be seen that the drawing-tool comprises two tubes or pipes A B, constituting the inlet and outlet pipes for the compressed air or other gaseous fluid used in blowing, A preferably constituting the inlet-pipe, having the opening I for the inlet of the gaseous fluid, and B preferably constituting the outlet-pipe, having the openings J and D. In Fig. 1 the tubes or pipes are arranged concentrically and are braced near their lower ends by a plurality of radial arms C. The outlet-tube is provided with escape-openings D at its upper end, which are normally closed by outwardly-opening valves E, held normally to their seats by springs F or their equivalents. The usual bait G is attached to the lower end of the outer tube. In the preferred construction (shown in Fig. 1) the inner tube is used as the inlet and the outer tube as the outlet.

Figure 3:
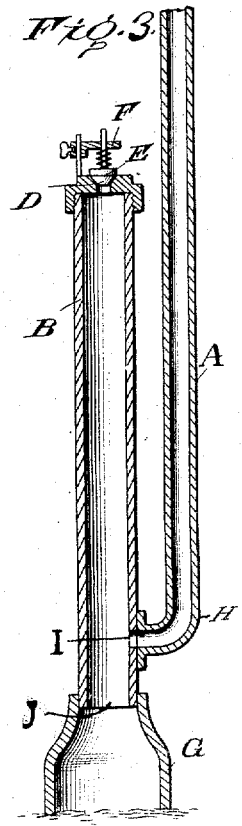

In Fig. 3 I have shown a slightly-modified form of the device, in which the two tubes are arranged side by side instead of concentrically and are joined near their lower ends just above the bait by an elbow H.

The operation of the drawing-tool will be readily understood. The drawing-tool is lowered in the bath of molten glass, and as soon as the lower edge of the bait comes in contact with the glass a small quantity of the blowing fluid is admitted through the inlet-pipe, so as to exert a slight pressure on the glass and prevent its rising within the bait. The bait is then pushed down into the bath a short distance (about four inches) and the pressure within the drawing-tool increased, so that a small bulb is started within the bath. The drawing-tool is then raised and increased pressure admitted thereto, so as to expand the glass adhering to the bait to form a jar or bottle neck, a cylindrical roller, or other article, as may be desired. The air or blowing fluid is of course raised in temperature by its contact with the hot glass and tends to rise, while the incoming fluid, being cooler, seeks the lowest point of the chamber formed by the glass, where it is heated by the glass and expands, so that a pressure will constantly be exerted at the working point of the cylinder. The heated air rising from the glass will pass out into the escape pipe or tube and will then escape through the ports in the end of the same when the pressure becomes excessive.

While my drawing-tool is intended more particularly for use in blowing cylinders for window-glass, it is adapted for the manufacture of all hollow glassware. The blowing fluid is admitted to the bait close to the molten glass, so as to quickly reach the point where it is to work. The escaping air leaves the bait through the same end that the incoming air enters and serves thereby to partly heat the fresh supply, so as to avoid a too-sudden chilling of the glass by the contact of the air therewith. The friction between the incoming and outgoing currents of air serves to retard the escaping current, so as to prevent its premature discharge, and this effect is increased in the preferred form of the device by the friction of the outgoing air upon the inlet-pipe. Furthermore, it will be noted that a cap is fitted over the end of the escape-pipe, so that the direct escape of the used air will be effectually and positively checked.

Having thus described my invention, what I claim, and desire to secure by Letters Patent, is—

1. A tool for blowing hollow glassware having a bait adapted to gather the glass, an inlet leading to the upper end of the bait, and an independent outlet leading from the upper end of the bait.

2. A tool for blowing hollow glassware comprising a bait adapted to gather the molten glass, an outlet-tube for the blowing fluid leading from the upper end of the bait, and an inlet-tube delivering the blowing fluid to the upper end of the bait near the lower end of the outlet-tube.

3. A tool for blowing hollow glassware comprising an inlet-tube, an outlet-tube surrounding and supported by the inlet-tube, and a bait on the lower end of the outlet-tube.

4. A glass blowing and drawing tool, a bait, an exit-opening leading to the glass article, a second exit-opening and an inlet-opening, adapted to be connected to a fluid-pressure supply independently of the bath-containing vessel.

5. A glass blowing and drawing tool, provided with means for maintaining a circulation in said tool fed by an air-supply independent of the bath-containing vessel.

6. A bait having three openings in communication therewith, *i. e.* an inlet, an exit for excess, and a blowing-opening leading to the hollow glass article.

Signed at Converse, Indiana, this 21st day of December, 1904.

AUGUSTE DEWERPE.

Witnesses:
GEO. H. HARVEY,
LEROY O. ARNOLD.